US 6,494,649 B2

(12) United States Patent
Queipo

(10) Patent No.: US 6,494,649 B2
(45) Date of Patent: Dec. 17, 2002

(54) TABLE FOR A DRILL PRESS

(76) Inventor: Juan C. Queipo, PMB 307, 10773 NW. 58th St., Miami, FL (US) 33178

( * ) Notice: Subject to any disclaimer, the term of this patent is extended or adjusted under 35 U.S.C. 154(b) by 73 days.

(21) Appl. No.: 09/791,365

(22) Filed: Feb. 23, 2001

(65) Prior Publication Data

US 2002/0159848 A1 Oct. 31, 2002

(51) Int. Cl.[7] .................. B23B 39/00; B23B 47/34
(52) U.S. Cl. ..................... 408/27; 408/67; 408/87; 408/108
(58) Field of Search ............. 408/27, 67, 76, 408/87, 103, 108, 234, 90; 269/309

(56) References Cited

U.S. PATENT DOCUMENTS

| 2,356,438 A | * | 8/1944 | Wilson .................. 269/158 |
| 2,383,201 A | * | 8/1945 | Kruchten ............... 269/146 |
| 2,471,940 A | * | 5/1949 | Dion ...................... 408/103 |
| 3,069,936 A | * | 12/1962 | Gideon ................... 408/90 |
| 3,118,261 A | * | 1/1964 | Glaude ................... 144/35.1 |
| 3,359,836 A | * | 12/1967 | Jalava .................... 269/99 |
| 4,072,439 A | | 2/1978 | Diggs ..................... 408/90 |
| 4,140,308 A | | 2/1979 | Disston, Jr. et al. ....... 269/87.3 |
| 4,510,980 A | | 4/1985 | Bartlett et al. ............ 144/1 C |
| 5,547,319 A | * | 8/1996 | Pollak .................... 403/366 |
| 5,769,575 A | * | 6/1998 | Stofflet et al. ............ 408/129 |
| 5,890,521 A | * | 4/1999 | Dunn ..................... 144/1.1 |
| 5,980,167 A | | 11/1999 | Chen ..................... 408/87 |

* cited by examiner

*Primary Examiner*—Daniel W. Howell
(74) *Attorney, Agent, or Firm*—Richard L. Miller

(57) ABSTRACT

A table for a drill press that includes a plate for attaching to the column of the drill press, a receptor associated with the plate and providing a well for providing clearance for a sanding cylinder operatively attached to the head of the drill press, a block replaceably disposed at least in the receptor for providing a work surface for resting a workpiece on when the workpiece is being drilled by the drill press or for securing a conventional vise to, and a clamp threadably engaging the cup, and when tightened against the block, maintains the block in the well. The plate has a throughbore that extends centrally therethrough. The receptor is a cup that depends perpendicularly from the throughbore in the plate. The block includes a lower portion that fills the cup, an optional upper portion that rests upon the plate, and an optional throughbore.

18 Claims, 1 Drawing Sheet

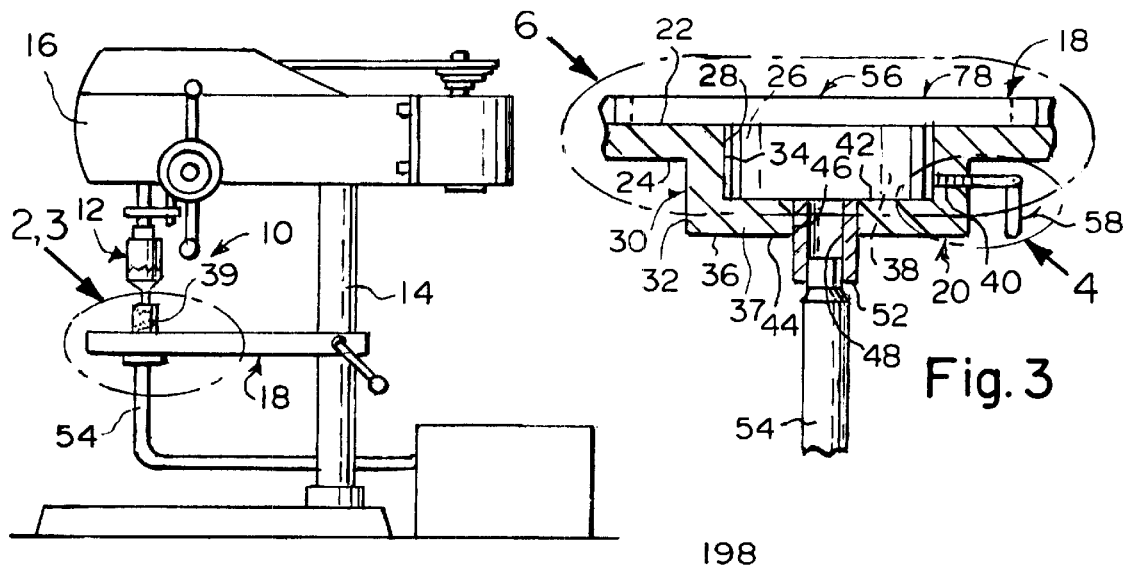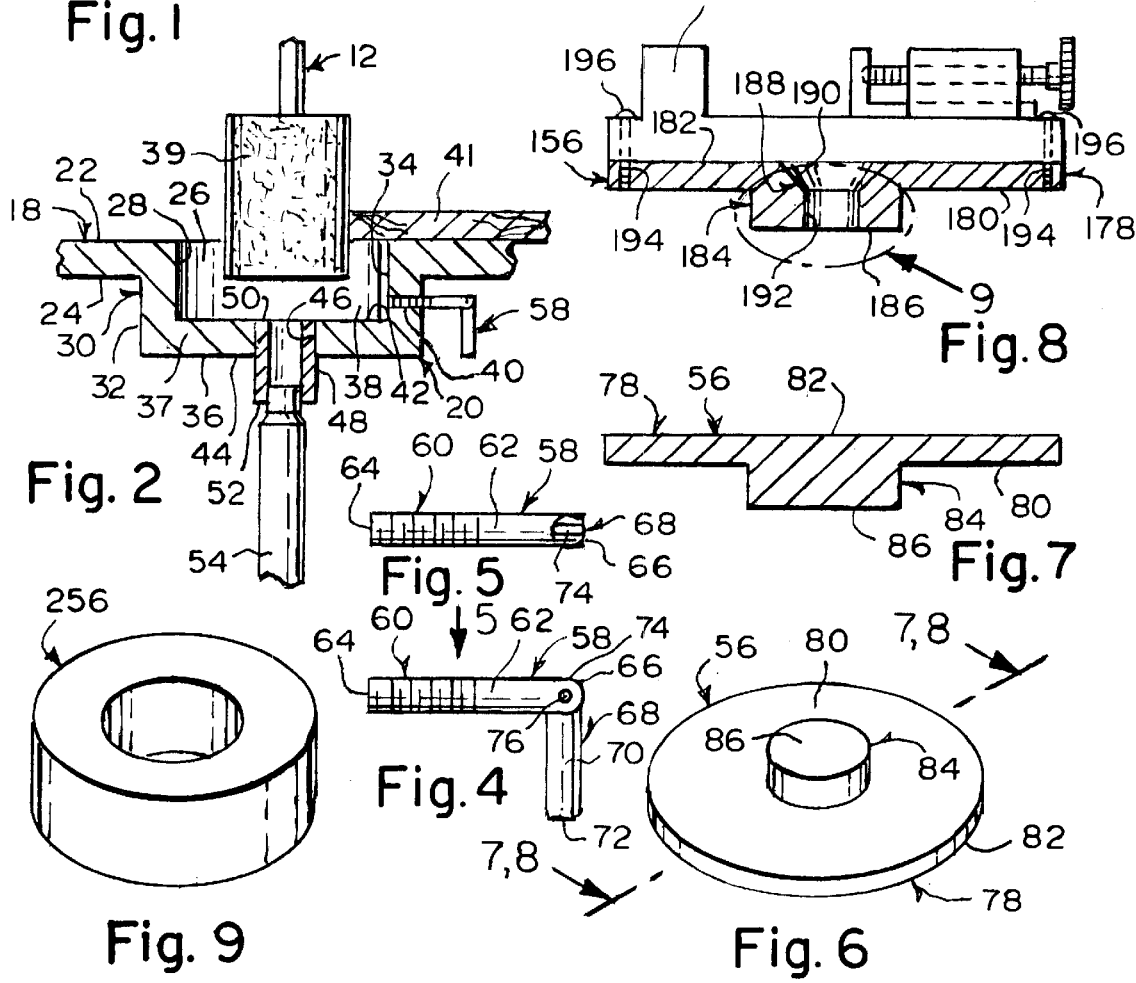

TABLE FOR A DRILL PRESS

BACKGROUND OF THE INVENTION

1. Field of the Invention

The present invention relates to a table. More particularly, the present invention relates to a table for a drill press.

2. Description of the Prior Art

Numerous innovations for power tool table accessories have been provided in the prior art that will be described. Even though these innovations may be suitable for the specific individual purposes to which they address, however, they differ from the present invention.

A first example, U.S. Pat. No. 4,072,439 to Diggs teaches an improved work-supporting table particularly adapted for shiftable mounting on the support column of a drill press which permits the reciprocable drill bit to cut through the entire thickness of workpiece material supported on the table surface without defacement of the latter irrespective of the drill bit position relative to the table. An arcuate groove in the table surface directly below the drill bit extends parallel to the swinging path of travel of the table relative to the drill bit and provides clearance for the bit when the latter is reciprocably advanced to the table surface. The recessed surface of the groove is covered by a strip of hardened material which is resistant to the cutting action of the drill bit thereby protecting the groove against inadvertent defacement by engagement with the bit. The groove is further provided with a T-shaped cross section to permit coupling with various workpiece holding means for clamping the workpiece material against the table surface in response to selective operation of a biasing mechanism.

A second example, U.S. Pat. No. 4,140,308 to Disston Jr. et al. teaches a work hold-down for use with a drill press and like machine tools including a sleeve loosely slidable along a column and contractible for clamping to the column, an arm extending from the sleeve over a work table, and a presser depending from the arm remote from the sleeve for downward pressing engagement for a work piece on the table when the sleeve is contracted.

A third example, U.S. Pat. No. 4,510,980 to Bartlett et al. teaches a table assembly for a multipurpose tool that is used in a combination with a tool of the type having a frame, a pair of parallel way tubes mounted on the frame, a headstock mounted on the frame having a motor driven spindle, and releasable pivots which allow the way tubes to be pivoted about their ends to a substantially vertical positions. The table assembly includes a table top, a pivot mounted beneath the table top, a pair of support legs having racks on opposite sides thereof and attached to the pivot, and a carriage, mounted on the way tubes, having channels to receive the support legs. A pair of pinion gears are positioned within the channels to mesh with the racks and are driven by a crank having a locking mechanism so that the table can be displaced relative to the carriage. The table top can be pivoted to a position so that it is perpendicular to and faces an axis of the output spindle in a drill press mode, or the support legs can be removed from the channels in the carriage, and the table and support legs reversed in position relative to the carriage so that the table faces away from the spindle in an under-the-table shaper mode.

A fourth example, U.S. Pat. No. 5,980,167 to Chen teaches a table fence assembly that comprises a rear fence, a front, and a plurality of locking bolts and locking nuts The rear fence has an L-shaped cross section that includes a horizontal section and a vertical section. The sections are each provided with an elongated hole. The front face also has an L-shaped cross section that defines a connecting section and a supporting section. The supporting section is provided with an opening for applying a fastener thereto.

It is apparent that numerous innovations for power tool table accessories have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

Accordingly, an object of the present invention is to provide a table for a drill press that avoids the disadvantages of the prior art.

Another object of the present invention is to provide a table for a drill press that is simple and inexpensive to manufacture.

Still another object of the present invention is to provide a table for a drill press that is simple to use.

Briefly stated, still yet another object of the present invention is to provide a table for a drill press that includes a plate for attaching to the column of the drill press, a receptor associated with the plate and providing a well for providing clearance for a sanding cylinder operatively attached to the head of the drill press, a block replaceably disposed at least in the receptor for providing a work surface for resting a workpiece on when the workpiece is being drilled by the drill press or for securing a conventional vise to, and a clamp threadably engaging the cup, and when tightened against the block, maintains the block in the well. The plate has a throughbore that extends centrally therethrough. The receptor is a cup that depends perpendicularly from the throughbore in the plate. The block includes a lower portion that fills the cup, an optional upper portion that rests upon the plate, and an optional throughbore.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

DESCRIPTION OF THE DRAWING

The figures of the drawing are briefly described as follows:

FIG. 1 is a diagrammatic sid elevational view of the present invention in use;

FIG. 2 is a diagrammatic side elevational view in partial section of the area generally enclosed by the dotted curve identified by arrow 2 in FIG. 1 of the present utilized for sanding;

FIG. 3 is a diagrammatic side elevational view in partial section of the area generally enclosed by the dotted curve identified by arrow 4 in FIG. 1 of the present invention utilized for drilling;

FIG. 4 is a diagrammatic side elevational view of the area generally enclosed by the dotted curve identified by arrow 4 in FIG. 3 of the clamp of the present invention;

FIG. 5 is a diagrammatic top plan view taken generally in the direction of arrow 5 in FIG. 4;

FIG. 6 is a diagrammatic perspective view of the area generally enclosed by the dotted curve identified by arrow 6 in FIG. 3 of a first embodiment of the block of the present invention;

FIG. 7 is a diagrammatic cross sectional view taken on line 7—7 in FIG. 6;

FIG. 8 is a diagrammatic cross sectional view taken on line 8—8 in FIG. 6 of a second embodiment of the block of the present invention; and FIG. 9 is a diagrammatic perspective view of the area generally enclosed by the dotted curve identified by arrow 9 in FIG. 8 of a third embodiment of the block of the present invention.

LIST OF REFERENCE NUMERALS UTILIZED
IN THE DRAWING 10 table of present invention for drill press 12
12 drill press
14 column of drill press 12
16 head of drill press 12
18 plate portion for attaching to, and extending laterally from, column 14 of drill press 12
20 receptor portion
22 uppermost surface of plate portion 18 for facing head 16 of drill press 12
24 lowermost surface of plate portion 18
26 throughbore in plate portion 18
28 perimeter defining throughbore 26 in plate portion 18
30 cup of receptor portion 20
32 longitudinal side wall of cup 30 of receptor portion 20
34 uppermost end of longitudinal side wall 32 of cup 30 of receptor portion 20
36 lowermost end of longitudinal side wall 32 of cup 30 of receptor portion 20
37 floor closing lowermost end 36 of longitudinal side wall 32 of cup 30 of receptor portion 20
38 well in plate portion 18
39 sanding cylinder
40 throughbore through longitudinal side wall 32 of cup 30 of receptor portion 20
41 workpiece
42 uppermost surface of floor 37 of cup 30 of receptor portion 20
44 lowermost surface of floor 37 of cup 30 of receptor portion 20
46 throughbore through floor 37 of cup 30 of receptor portion 20
48 tailpiece of cup 30 of receptor portion 20
50 uppermost end of tailpiece 48 of cup 30 of receptor portion 20
52 lowermost end of tailpiece 48 of cup 30 of receptor portion 20 for receiving vacuum hose 54
54 vacuum hose
56 block for providing work surface for resting workpiece 41
58 clamp
60 first portion of clamp 58
62 rod of first portion 60 of clamp 58
64 distal end of rod 62 of first portion 60 of clamp 58
66 proximal end of rod 62 of first portion 60 of clamp 58
68 second portion of clamp 58
70 rod of second portion 68 of clamp 58
72 distal end of rod 70 of second portion 68 of clamp 58
74 proximal end of rod 70 of second portion 68 of clamp 58
76 pin of clamp 58

First Embodiment of Block 56

56 block
78 upper portion
80 lowermost end of upper portion 78
82 uppermost end of upper portion 78 for supporting workpiece 41
84 lower portion
86 lowermost end of lower portion 84

Second Embodiment of Block 156

156 block
178 upper portion of block 156
180 lowermost end of upper portion 178 of block 156
182 uppermost end of upper portion 178 of block 156
184 lower portion of block 156
186 lowermost end of lower portion 184 of block 156
188 throughbore
190 upper portion of throughbore 188
192 lower portion of throughbore 188
194 peripheral throughbores for threadably receiving bolts 196
196 bolts
198 conventional vise Third Embodiment of Block 256

256 block

DETAILED DESCRIPTION OF THE
PREFERRED EMBODIMENT

Referring now to the figures, in which like numerals indicate like parts, and particularly to FIG. 1, the table of the present invention is shown generally at 10 for a drill press 12, wherein the drill press 12 has a column 14 and a head 16 that is operatively connected to the column 14 thereof.

The general configuration of the table 10 can best be seen in FIGS. 2 and 3, and as such, will be discussed with reference thereto.

The table 10 comprises a plate portion 18 for attaching to, and extending laterally from, the column 14 of the drill press 12, and a receptor portion 20 that is associated with the plate portion 18.

The plate portion 18 has an uppermost surface 22 for facing the head 16 of the drill press 12, and a lowermost surface 24 that is opposite to the uppermost surface 22 thereof.

The plate portion 18 further has a throughbore 26 that is circular-shaped, extends centrally therethrough from the uppermost surface 22 thereof to the lowermost surface 24 thereof, and is defined by a perimeter 28.

The receptor portion 20 is a cup 30 that depends perpendicularly from the plate portion 18.

The cup 30 is tubular, cylindrically-shaped, hollow, and has a longitudinal side wall 32 with an uppermost end 34 that is open, and coincident with the perimeter 28 of, and communicates with, the throughbore 26 in the plate portion 18, with the cup 30 depending therefrom, and a lowermost end 36 that is closed by a floor 37 so as to allow the cup 30 to form a well 38 in the plate portion 18, and when the well 38 is empty, the well 38 providing a space for a sanding cylinder 39 that is operatively connected to the head 16 of the drill press 12 to depend partially in and sand a workpiece 41 resting on the uppermost surface 22 of the plate portion 18 and abutting against the sanding cylinder 39.

The longitudinal side wall 32 of the cup 30 further has a throughbore 40 that is threaded and extends perpendicularly therethrough and communities with the well 38.

The floor 37 of the cup 30 has an uppermost surface 42 and a lowermost surface 44 that is opposite to the uppermost surface 42 thereof.

The floor 37 of the cup 30 further has a throughbore 46 that extends centrally therethrough from the uppermost surface 42 thereof to the lowermost surface 44 thereof.

The cup 30 further has a tailpiece 48 that is tubular, hollow cylindrically-shaped, depends in the throughbore in the floor 37 of the cup 30, and has an uppermost end 50 that is flush with the uppermost surface 42 of the floor 37 of the cup 30 and is open so as to communicate with the well 38, and a lowermost end 52 that extends below the lowermost surface 44 of the floor 37 of the cup 30 for receiving a vacuum hose 54 that removes debris from the workpiece 41 as the workpiece 41 is being worked upon.

The table 10 further has a block 56 that is replaceably disposed at least in the well 38 for providing a work surface for resting the workpiece 41 on when the workpiece 41 is being drilled by the drill press 12.

The table 10 further has a clamp 58 that threadably engages in the throughbore 40 in the longitudinal side wall 32 of the cup 30, and selectively tightens against the block 56, and when tightened against the block 56, maintains the block 56 in the well 38.

The specific configuration of the clamp 58 can best be seen in FIGS. 4 and 5, and as such, will be discussed with reference thereto.

The clamp 58 comprises a first portion 60 that is a rod 62 that has a distal end 64, a proximal end 66 that has bifurcations, and a length.

The rod 62 of the first portion 60 of the clamp 58 is threaded from the distal end 64 thereof along approximately half the length thereof, and threadably engages in the throughbore 40 in the longitudinal side wall 32 of the cup 30, with the distal end 64 thereof selectively abutting against the block 56, and when abutted against the block 56, maintains the block 56 in the well 38.

The clamp 58 further comprises a second portion 68 that is a rod 70 that has a distal end 72 that is free and a proximal end 74 that is flattened and pivotally mounted between the bifurcations of the proximal end 66 of the rod 62 of the first portion 60 of the clamp 58 by a pin 76 so as to form a constantly depending handle for turning the clamp 58.

The specific configuration of a first embodiment of the block 56 can best be seen in FIGS. 6 and 7, and as such, will be discussed with reference thereto.

The block 56 comprises an upper portion 78 that is disk-shaped, and has a lowermost end 80 that rests on, and completely covers, the uppermost surface 22 of the plate portion 18, and an uppermost end 82 for supporting the workpiece 41.

The block 56 further comprises a lower portion 84 that is cylindrically-shaped, depends concentrically from, and is narrower than, the lowermost end 80 of the upper portion 78 of the block 56 to a lowermost end 86 that abuts against the uppermost surface 42 of the floor 37 of the cup 30 so as to fill the well 38 and hold the block 56 against lateral movement.

The specific configuration of a second embodiment of the block 156 can best be seen in FIG. 8, and as such, will be discussed with reference thereto.

The block 156 is similar to the block 56 with the addition of a throughbore 188 that extends centrally therethrough from the uppermost end 182 of the upper portion 178 thereof to the lowermost end 186 of the lower portion 184 thereof.

The throughbore 188 in the block 156 has an upper portion 190 that tapers from the uppermost end 182 of the upper portion 178 of the block 156 to the lowermost end 180 of the upper portion 178 of the block 156.

The throughbore 188 in the block 156 further has a lower portion 192 that communicates with, and depends coaxially from, the upper portion 190 thereof and communicates with the tailpiece 48.

The block 156 further has peripheral throughbores 194 that are threaded and extend through the upper portion 178 thereof from the uppermost end 182 of the upper portion 178 thereof to the lowermost end 180 of the upper portion 178 thereof for threadably receiving bolts 196 that hold a conventional vise 198 on the uppermost end 182 of the upper portion 178 of the block 156, with the conventional vise 198 communicating with the throughbore 188 in the block 156 for ultimately communicating with the vacuum hose 54 so as to remove debris from the workpiece 41 as the workpiece 41 is being worked upon in the conventional vise 198.

The specific configuration of a third embodiment of the block 256 can best be seen in FIG. 9, and as such, will be discussed with reference thereto.

The block 256 is identical to the lower portion 184 of the block 156.

It will be understood that each of the elements described above, or two or more together, may also find a useful application in other types of constructions differing from the types described above.

While the invention has been illustrated and described as embodied in a table for a drill press, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A table for a drill press, wherein the drill press has a column and a head that is operatively connected to the column thereof, said table comprising:
   A) a plate portion for attaching to, and extending laterally from, the column of the drill press; and
   B) a receptor portion associated with said plate portion, wherein said plate portion has:
      I) an uppermost surface for facing the head of the drill press; and
      II) a lowermost surface that is opposite to said uppermost surface thereof, wherein said plate portion further has a throughbore that is circular-shaped, extends centrally therethrough from said uppermost surface thereof to said lowermost surface thereof, and is defined by a perimeter, wherein said receptor portion is a cup that depends perpendicularly from said plate portion, wherein said cup is tubular, cylindrically-shaped, hollow, and has a longitudinal side wall with:
         a) an uppermost end that is open, and coincident with said perimeter of, and communicates with, said throughbore in said plate portion, with said cup depending therefrom; and
         b) a lowermost end that is closed by a floor so as to allow said cup to form a well in said plate portion, and when said well is empty, said well provides a space for a sanding cylinder that is operatively connected to the head of the drill press to depend partially in and sand a workpiece resting on said uppermost surface of said plate portion and abutting against the sanding cylinder.

2. The table as defined in claim 1, wherein said longitudinal side wall of said cup further has a throughbore that is threaded and extends perpendicularly therethrough and communicates with said well.

3. The table as defined in claim 2, wherein said floor of said cup has:
   a) an uppermost surface; and
   b) a lowermost surface that is opposite to said uppermost surface thereof.

4. The table as defined in claim 3, wherein said floor of said cup further has a throughbore that extends centrally therethrough from said uppermost surface thereof to said lowermost surface thereof.

5. The table as defined in claim 4, wherein said cup further has a tailpiece that is tubular, hollow, cylindrically-shaped, depends in said throughbore in said floor of said cup, and has:
   a) an uppermost end that is flush with said uppermost surface of said floor of said cup and is open so as to communicate with said well; and
   b) a lowermost end that extends below said lowermost surface of said floor of said cup for receiving a vacuum hose that removes debris from the workpiece as the workpiece is being worked upon.

6. The table as defined in claim 5, wherein said block comprises an upper portion that is disk-shaped, and has:
   a) a lowermost end that rests on, and completely covers, said uppermost surface of said plate portion; and
   b) an uppermost end for supporting the workpiece.

7. The table as defined in claim 6, wherein said block further comprises a lower portion that is cylindrically-shaped, depends concentrically from, and is narrower than, said lowermost end of said upper portion of said block to a lowermost end that abuts against said uppermost surface of said floor of said cup so as to fill said well and hold said block against lateral movement.

8. The table as defined in claim 7, wherein said block further has a throughbore that extends centrally therethrough from said uppermost end of said upper portion thereof to said lowermost end of said lower portion thereof.

9. The table as defined in claim 8, wherein said block further has peripheral throughbores that are threaded and extend through said upper portion thereof from said uppermost end of said upper portion thereof to said lowermost end of said upper portion thereof for threadably receiving bolts that hold a conventional vise on said uppermost end of said upper portion of said block, with the conventional vise communicating with said throughbore in said block for ultimately communicating with the vacuum hose so as to remove debris from the workpiece as the workpiece is being worked upon in the conventional vise.

10. The table as defined in claim 3; further comprising a block replaceably disposed at least in said well for providing a work surface for resting the workpiece on when the workpiece is being drilled by the drill press.

11. The table as defined in claim 10; further comprising a clamp threadably engaging in said throughbore in said longitudinal side wall of said cup, and selectively tightening against said block, and when tightened against said block, maintains said block in said well.

12. The table as defined in claim 10, wherein said clamp comprises a first portion that is a rod that has:
   a) a distal end;
   b) a proximal end that has bifurcations; and
   c) a length.

13. The table as defined in claim 12, wherein said rod of said first portion of said clamp is threaded from said distal end thereof along approximately half said length thereof, and threadably engages in said throughbore in said longitudinal side wall of said cup, with said distal end thereof selectively abutting against said block, and when abutting against said block, maintains said block in said well.

14. The table as defined in claim 12, wherein said clamp further comprises a second portion that is a rod that has:
   a) a distal end that is free; and
   b) a proximal end that is flattened and pivotally mounted between said bifurcations of said proximal end of said rod of said first portion of said clamp by a pin so as to form a constantly depending handle for turning said clamp.

15. The table as defined in claim 10, wherein said block is cylindrically-shaped, fills said well, and has:
   a) a lowermost end that abuts against said uppermost surface of said floor of said cup; and
   b) an uppermost end that is flush with said uppermost surface of said plate.

16. The table as defined in claim 15, wherein said block further has a throughbore that extends centrally therethrough from said uppermost end thereof to said lowermost end thereof.

17. The table as defined in claim 8, wherein said throughbore in said block has an upper portion that tapers from said uppermost end of said upper portion of said block to said lowermost end of said upper portion of said block.

18. The table as defined in claim 17, wherein said throughbore in said block further has a lower portion that communicates with, and depends coaxially from, said upper portion thereof and communicates with said tailpiece.

* * * * *